United States Patent
Lottes

(10) Patent No.: US 9,490,643 B2
(45) Date of Patent: Nov. 8, 2016

(54) METHOD FOR OPERATING AN ELECTRONIC APPLIANCE, CHARGING APPARATUS FOR CHARGING A BATTERY FOR AN ELECTRONIC APPLIANCE, AND MOTOR VEHICLE

(71) Applicant: AUDI AG, Ingolstadt (DE)

(72) Inventor: Daniel Lottes, Kelheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/439,244

(22) PCT Filed: Oct. 18, 2013

(86) PCT No.: PCT/EP2013/003139
§ 371 (c)(1),
(2) Date: Apr. 29, 2015

(87) PCT Pub. No.: WO2014/067627
PCT Pub. Date: May 8, 2014

(65) Prior Publication Data
US 2015/0295444 A1  Oct. 15, 2015

(30) Foreign Application Priority Data
Nov. 2, 2012  (DE) .................. 10 2012 021 638

(51) Int. Cl.
*H02J 7/00* (2006.01)
*H01M 10/44* (2006.01)

(52) U.S. Cl.
CPC ............ *H02J 7/0052* (2013.01); *H01M 10/44* (2013.01); *H02J 7/0032* (2013.01); *H02J 2007/0096* (2013.01)

(58) Field of Classification Search
CPC ................. H02J 7/0032; H02J 7/0052; H02J 2007/0096; H01M 10/44
USPC .................................. 320/107, 108, 137, 155
See application file for complete search history.

(56) References Cited

U.S. PATENT DOCUMENTS 5,648,711 A        7/1997   Hakkarainen
2011/0050164 A1*   3/2011   Partovi .................. H01F 5/003
                                                        320/108

(Continued)

FOREIGN PATENT DOCUMENTS

CN        101398459         4/2009
CN        102393837         3/2012

(Continued)

OTHER PUBLICATIONS

WIPO English Language Translation of the International Preliminary Report on Patentability for PCT/EP2013/003139, mailed May 7, 2015, 5 pages.

(Continued)

*Primary Examiner* — Edward Tso
*Assistant Examiner* — Aaron Piggush
(74) *Attorney, Agent, or Firm* — Staas & Halsey LLP

(57) ABSTRACT

A method operates an electronic appliance that has a battery and a charging device for charging the battery with electric current. At least one functionality of the electronic appliance is set to a state that has previously been selected by a user of the electronic appliance when a coupling state of the charging device to a charging apparatus, which is external to the electronic appliance, for charging the battery is altered. A charging apparatus charges the battery for the electronic appliance.

11 Claims, 1 Drawing Sheet

(56) References Cited

U.S. PATENT DOCUMENTS

| | | |
|---|---|---|
| 2011/0175576 A1 | 7/2011 | Uesaka et al. |
| 2012/0115549 A1 | 5/2012 | Kim et al. |
| 2012/0235636 A1 | 9/2012 | Partovi |

FOREIGN PATENT DOCUMENTS

| | | |
|---|---|---|
| CN | 102636709 | 8/2012 |
| DE | 10345437 | 5/2005 |
| DE | 10 2012 021 638.6 | 11/2012 |
| EP | 2086085 | 8/2009 |
| WO | 2007/035103 | 3/2007 |
| WO | PCT/EP2013/003139 | 10/2013 |

OTHER PUBLICATIONS

German Office Action for German Priority Patent Application No. 10 2012 021 638.6, issued Aug. 8, 2013, 6 pages.

English language International Search Report for PCT/EP2013/003139, mailed on Feb. 17, 2014, 3 pages.

Chinese Office Action issued on Jul. 27, 2016 in corresponding Chinese Patent Application No. 201380056902.0.

* cited by examiner

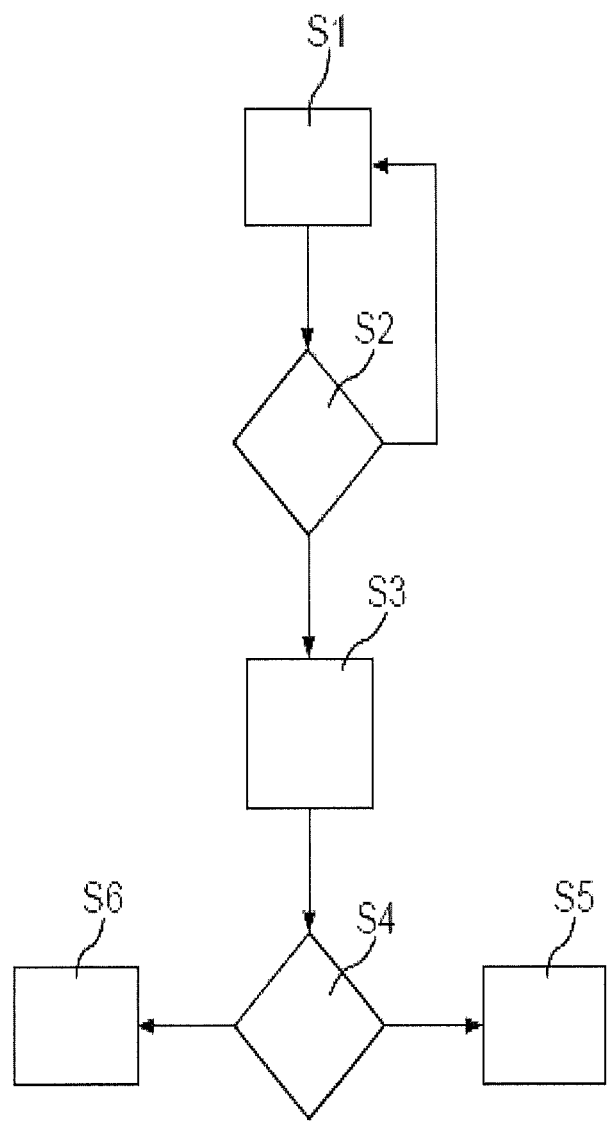

METHOD FOR OPERATING AN ELECTRONIC APPLIANCE, CHARGING APPARATUS FOR CHARGING A BATTERY FOR AN ELECTRONIC APPLIANCE, AND MOTOR VEHICLE

CROSS REFERENCE TO RELATED APPLICATIONS

This application is based on and hereby claims priority to International Application No. PCT/EP2013/003139 filed on Oct. 18, 2013 and German Application No. 10 2012 021 638.6 filed on Nov. 2, 2012, the contents of which are hereby incorporated by reference.

BACKGROUND

The invention relates to a method for operating an electronic appliance, to a charging device for charging a battery of an electronic appliance, and to a motor vehicle.

Electronic appliances such as, for example, what are referred to as laptops, PDAs (personal digital assistants), mobile radio appliances, in particular mobile phones, smart phones or tablet PCs are sufficiently known from the general related art. Such an, in particular portable, electronic appliance has a battery and a charging device for charging the battery with electric current. By the battery, at least one component of the electronic appliance can be supplied with electric current without the charging device being electrically connected via a cable to a power network which is external to the electronic appliance.

The component which is to be supplied with electric current is, for example, a computing device for executing a computer program, which is usually also referred to as an application or an app. A mobile radio appliance can also be connected to at least one radio network using radio technology.

If the electronic appliance is not coupled via its charging device to a charging apparatus, referred to as a charging unit, which is external to the electronic apparatus, for charging the battery, the computing device is, for example, supplied with electric current from the battery and the battery therefore discharges successively. In order subsequently to charge the battery again, the charging device of the electronic appliance is coupled to the charging apparatus, which is or can be in turn coupled to a power source, for example in the form of the power network, which is external to the electronic appliance. As a result, the battery can be supplied with current from the electric power source and as a result charged.

Modern mobile radio appliances have functionalities which go beyond merely making telephone calls. Such functionalities are, for example, a wireless data transmission, for example in the form of a data transmission via infrared rays, via Bluetooth or by radio via WLAN (Wireless Local Area Network), which is made available by a transmission module. In addition, such a wireless transmission can be a positioning functionality, for example via GPS (Global Positioning System) by which the position of the mobile radio appliance on the earth can be determined in a wireless fashion. If these functionalities are activated, they bring about increased consumption of electric current compared to their respective deactivated state. On account thereof, the battery is more quickly discharged. Therefore, the deactivation of these functionalities is appropriate when they are not required.

Other electronic appliances also have functionalities which are useful to a user of the electronic appliance in many situations but which can appropriately be deactivated in some situations in order to save current stored in the battery. This may be case, for example, of a wireless data transmission of a laptop, which does not always have to be activated.

However, if the functionalities are deactivated and they are required, it is then sometimes necessary for the user to make a variety of laborious inputs into the electronic appliance on the electronic appliance in order to activate the functionalities again. This need-oriented activation and deactivation of the functionalities therefore gives rise to an interaction of the user with the electronic appliance which is time consuming in total.

SUMMARY

One possible object is therefore to make available a method for operating an electronic appliance, a charging apparatus for charging a battery of an electronic appliance, and a motor vehicle by which the described, time-consuming operator control of the electronic appliance can be avoided.

The inventor proposes a method for operating an electronic appliance. The electronic appliance comprises a battery and a charging device for charging the battery with electric current. In order to charge the battery with electric current, the charging device is electrically coupled to a charging apparatus which is external to the electronic apparatus, wherein the charging apparatus itself is coupled or can be coupled to a power source which is external to the electronic appliance. On account thereof, electric current can be fed from the power source into the battery via the charging apparatus and the charging device.

Within the scope of the proposed method there is provision that at least one functionality of the electronic appliance is set to a state which has previously been selected by a user of the electronic appliance when a coupling state of the charging device to a charging apparatus, which is external to the electronic appliance, for charging the battery is changed. In other words before a change of the coupling state of the charging device the user can use the charging apparatus to select a state of the functionality in which the functionality is placed when a change in the coupling state occurs.

This change in the coupling state is to be understood as meaning that the charging device, firstly decoupled from the charging apparatus, of the electronic apparatus is electrically coupled to the external charging apparatus. In addition, it is to be understood as meaning that the charging device, firstly coupled to the charging apparatus, of the electronic apparatus is electrically decoupled from the external charging apparatuses.

If the charging device is, for example, firstly decoupled from the charging apparatus and then the charging device is then electrically coupled to the charging apparatus, the functionality is placed in the state which was selected by the user before the coupling. If the functionality is in a different state before the coupling, its state is changed to the previously selected state. If the functionality is already in the selected state before the coupling, its state is retained.

The method therefore permits need-oriented setting of the state of the functionality, which is desired and, in particular, can be set or selected by the user, when the user couples or decouples the charging device to or from the charging apparatus. This makes it possible to avoid a situation in which the user has to make inputs into the electronic device on the electronic device when the coupling state changes, in order to set the desired state of the functionality manually. In contrast to this, the setting of the desired state—after the selection of said state by the user—occurs automatically when the coupling state changes.

On account thereof it is possible, for example, to deactivate the functionality when the charging device is coupled to the charging apparatus, with the result that the functionality no longer consumes an electric current. As a result, the battery can be charged particularly quickly.

Furthermore, within the scope of the method it is possible, when changing the coupling state, to set a plurality of functionalities of the electronic appliance to respective states which have previously been selected by the user. The totality of the respective states of the functionalities is usually also referred to as a profile. This means that by changing of the coupling state at least one profile which can be selected and/or configured by the user and which comprises the respective states of the functionalities which are respectively different from one another can be automatically activated or deactivated when the coupling state changes.

This makes it possible, for example, to activate a first of the functionalities and to deactivate a second of the functionalities when the charging device is coupled to the charging apparatus. It is therefore possible to bring about the desired state of the respective functionality on a need-oriented basis and as a function of a current environment and situation of the user. In other words, the method permits the implementation of an environment-dependent setting of the selectable state of the at least one functionality.

In one particular advantageous refinement there is provision that a mobile radio unit which can be connected to at least one radio network using radio technology and has a computing device for executing at least one computer program is operated as the electronic appliance. Such a mobile radio appliance has a multiplicity of different functions which are very useful to the user in many situations but which could or should appropriately be deactivated in some situations, for example, in order to save current. In addition, a mobile radio appliance is a portable electronic appliance which is very frequently, if not even always, carried on the user's person. On account thereof, together with the user it often enters different environmental situations which could require a frequent change in the respective state of the functionalities. The method therefore permits particularly simple and convenient as well as need-oriented operator control and automatic changing of the respective state.

If the driver, for example, enters a motor vehicle with his mobile radio appliance (portable electronic appliance), it may be desirable to activate a first functionality in the form of a wireless state of transmission via Bluetooth, in order on account thereof to couple and be able to use a hands free device of the motor vehicle with the mobile radio appliance. In addition it is desirable to deactivate a second functionality in the form of a wireless state of transmission via WLAN which is usually also referred to as WiFi, and a third functionality in the form of a wireless state of transmission via GPS, in order to be able to charge the battery particularly quickly via a charging apparatus of the motor vehicle.

If the user couples his mobile radio apparatus to the charging apparatus of the motor vehicle, the method permits the respectively desired state to be set, wherein the wireless data transmission is activated via Bluetooth and the respective wireless data transmission is deactivated via WLAN and via GPS. When the user exits the motor vehicle and therefore the associated decoupling of the charging device for the charging apparatus takes place it is, for example, desirable to deactivate the data transmission via Bluetooth and to activate the respective wireless data transmission via WLAN and via GPS, in order, on the one hand, to save electric current and, on the other hand, to be able to use corresponding services via WLAN and GPS. This setting of the respective state by the method is also possible automatically and without additional active involvement of the driver. On account thereof it is possible to avoid a situation in which the user always has to carry out the same actions which are time-consuming in total when entering and exiting a vehicle. On account thereof, a particularly need-oriented and environmentally dependent setting of the respective states can be implemented.

The electronic appliance comprises, for example, a computing device for executing at least one computer program, wherein the computing device can be supplied with electric current by the battery. The functionality whose state is changed can also be the computer program. In other words, the changing of the state of the functionalities is also to be understood as meaning that a computer program of the electronic appliance which can be executed by the computing device is started or ended or—if the computer program is already started but is being executed in the background with the result that a user interface of the computer program is not displayed by a display of the electronic appliance—is changed in respect of its state in such a way that the user interface is displayed by the display.

The electronic appliance can be what is referred to as a laptop, that is to say a portable PC (personal computer), a PDA (personal digital assistant), a mobile radio appliance, in particular a cell phone, smart phone or a tablet PC or some other, in particular portable, electronic appliance.

In one particularly advantageous embodiment, a wireless data transmission, which is made available by a transmission module, is set to the selected state. Such functionalities provide, on the one hand, a large benefit. On the other hand, they give rise to high power consumption. On account of the automatic and need-oriented setting of such functionalities it is possible on the hand, for the power consumption, and therefore the availability of the functionalities to be increased and, on the other hand for very good usability of the electronic appliance to be implemented in a convenient fashion.

In a particularly advantageous refinement, changes in an electrical supply voltage which is applied to the charging device, for charging supply voltage, which is applied to the charging device for charging the battery are brought about over a period of time by the charging apparatus, wherein the state is set as a function of the changes in the electrical voltage. As a result of the changes in the supply voltage is possible to modulate a signal onto the supply voltage, wherein the state is set as a function of this signal. As a result it is possible, for example, to detect on the basis of the signal a plurality of charging apparatus which are independent of one another, since the charging apparatuses bring about, for example, respective changes in the supply voltage which are different from one another and correspondingly emit signals which are different from one another. As a result it is possible to set the state as a function of the charging apparatus which is coupled to the charging device, in order thereby to implement a particularly need-oriented and environmentally dependent setting. The detection of the charging-unit-specific signal takes place here, for example, by the computer program.

In a further embodiment, the functionality of the electronic appliance is set to a further state which has previously been selected by the user when the charging device is coupled to a further charging apparatus, which is external to the electronic appliance, for charging the battery. On account thereof, it is, for example, possible to activate the functionality when the charging device is coupled to the first charging apparatus and to deactivate the functionality, or cause the functionality to be deactivated, when the charging device is coupled to the further charging apparatus. The state of the functionality can therefore be adapted particularly well to the current environment and therefore to the current situation of the user.

In order to be able to differentiate the charging apparatuses from one another in a particularly simple way, there is provision in a further embodiment that in order to detect the coupling of the charging device to the first charging apparatus or to the further charging apparatus, the changes brought about over the period of time by the charging apparatus coupled to the charging device in the electrical supply voltage which is applied to the charging the device are evaluated by the charging apparatus the changes. The respective signal which is to be output by the corresponding charging apparatus is therefore used to identify unambiguously the respective charging apparatus and to be able to assign the associated state of the functionality to the identified charging apparatus.

On account thereof it is, in particular, possible, depending on the charging apparatus which is coupled to activate or deactivate profiles which are configured by the user, without the user of the electronic appliance having to make time-consuming and laborious inputs into the electronic appliance on the electronic appliance.

In order to implement a possible way of selecting the state of the functionality desired by the user which is particularly simple and convenient for the user, in a further embodiment there is provision that the electronic appliance makes available an input possibility, in particular a user interface, by which the state can be selected by an input, effected on the electronic appliance into the electronic appliance, which is effected on the electronic appliance by the user. Such an input possibility is, for example, a computing program which is to be executed by the computing device and has a user interface which can be displayed by the display of the electronic appliance. By such a computing program which has a user interface the user can make inputs into the electronic appliance on the electronic appliance in a particularly simple way and therefore select the state which the user desires to set. Such a computer program is usually also referred to as an application or as an app which can be programmed for different operating systems such as, for example, iOS, Android, Windows etc.

By the computer program it is preferably also possible to create the profiles, i.e. to configure and select them. These profiles comprise, for example, a multiplicity of respective states which are to be set for a plurality functionalities of the electronic appliance.

In addition it is possible to provide that the computer program logs specific changes in the supply voltage. Furthermore, it can advantageously be provided that, for example, stored voltage patterns, i.e. timing sequences of changes in the supply voltage at the charging device, can be assigned to respective profiles. If one of these changes in the supply voltage is brought about by the charging apparatus, the profile which is assigned to these changes in the supply voltage is, for example, activated, while the other profiles are deactivated. The activation and deactivation of a profile means that the respective states of the functionalities in question, which are assigned to the profile, are set.

A second aspect of the proposal relates to a charging apparatus for charging a battery of an electronic appliance with electric current. The charging apparatus comprises a control unit which is configured to bring about changes in an electrical supply voltage over a period of time, for charging the battery, and on account thereof to modulate onto the electric supply voltage an identification signal by which the charging apparatus can be identified by the electronic appliance.

On account thereof it is possible to identify a plurality of charging apparatuses which are different from one another and which modulate onto the supply voltage respective identification signals which are different from one another, and to differentiate between these charging apparatuses. As a result it is possible to set at least one state of at least on functionality of the electronic appliance as a function of the charging apparatus, coupled to the charging device of the electronic appliance, to a state which is selected by a user of the electronic appliance before the coupling. This permits the implementation of a need-oriented and environmentally dependent setting of the state of the functionality in a particularly simple way when charging apparatuses which are coupled to a power source are used by the user to charge the battery at different locations or localities.

The aspects are therefore based on the common concept of implementing an environmentally dependent setting of the state of the functionality without the user having to make laborious and time-consuming inputs into the electronic appliance on the electronic appliance. Advantageous refinements of the first aspect are to be considered to be advantageous refinements of the second aspect, and vice versa.

A third aspect of the proposal relates to a motor vehicle having the proposed charging apparatus in accordance with the second aspect and/or having a computer unit which is configured to execute a the proposed method in accordance with the first aspect. The motor vehicle permits adaptation of the state of the functionality to a journey with the motor vehicle in a way which is simple, rapid and convenient for the user, without the user having to make inputs on the electronic appliance whenever the user enters or exits the motor vehicle.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The FIGURE shows a flow chart illustrating a method for operating an electronic appliance which is in the form of a mobile radio appliance here, and for operating a charging apparatus for the mobile radio appliance.

DETAILED DESCRIPTION OF THE PREFERRED EMBODIMENT

Reference will now be made in detail to the preferred embodiments of the present invention, examples of which are illustrated in the accompanying drawing.

The drawing shows in the single FIGURE a flowchart illustrating a method for operating a mobile radio appliance and for operating a charging apparatus for charging a battery of the mobile radio appliance with electric current, wherein an identification signal is transmitted to the mobile radio appliance by the charging apparatus, and wherein respective functionalities of the mobile radio apparatus appliance are set as a function of the identification signal to a respective state which has previously been selected by a user of the mobile radio appliance when the mobile radio appliance is electrically coupled to the charging apparatus for charging the battery.

The FIGURE shows a flow chart illustrating a method for operating an electronic appliance which is in the form of a mobile radio appliance here, and for operating a charging apparatus for the mobile radio appliance.

The mobile radio appliance is, for example, a smart phone which comprises a computing device for executing at least one computer program and a battery for supplying the computing device with electric current. The mobile radio appliance can additionally be connected to at least one radio network using radio technology, and has a display by which, for example, a user interface of the computer program can be displayed. Via this user interface, a user of the mobile radio appliance can make inputs into the mobile radio appliance on the mobile radio appliance in order, for example, to bring about functions of the mobile radio appliance.

As a result of the supplying of the computing device with electric current, the battery is discharged. In order to charge the battery again with electric current, a charging apparatus which is external to the mobile radio appliance, and which is usually also referred to as a charging unit, is used. In order to charge the battery with electric current, the mobile radio appliance also comprises a charging device to which the charging unit can be electrically coupled. The charging unit can also be coupled to an external power source, such that electric current can be fed from the power source into the battery via the charging apparatus and the charging device.

In addition, the mobile radio appliance has a multiplicity of functionalities. A first of these functionalities is a wireless data transmission, made available by a transmission module, via WLAN, which is customarily also referred to as WiFi. A second of the functionalities is here a wireless data transmission, made available by the transmission module, via the Bluetooth data transmission standard. The functionalities can be set here to respective different states. The first functionality has here a first state in which the first functionality is activated. In addition, the first functionality has a second state in which the first functionality is deactivated. Accordingly, the second functionality has a first state in which the second functionality is activated. The second functionality also has the second state in which the second functionality is deactivated. The functionalities can be switched between their respective states here.

Depending on the current environment in which the user of the mobile radio appliance is located, different states of the respective functionalities may be appropriate or necessary. If the user is located, for example, in a motor vehicle, it may be appropriate to deactivate the first functionality and to activate the second functionality, since the user can use, for example, a wireless data transmission via WLAN which is made available by the motor vehicle, and since his mobile radio appliance is to be coupled to a hands free device of the motor vehicle via the second functionality.

However, if the first functionality is then activated and the second functionality deactivated and if the user enters the motor vehicle, he must change the respective state of the corresponding functionality in a time-consuming fashion if no corresponding measures are taken. The figure describes a possible way of being able to avoid such a time-consuming and inconvenient change.

Within the scope of the method, first in S1 it is checked whether the mobile radio appliance is electrically connected as a current collector consumer to the charging unit. Second, if it is detected in S2 that no current consumer is electrically coupled to the charging unit, S2 is followed again by S1. Third, if it is detect in S2 that the mobile radio appliance is electrically coupled to the charging unit, S2 is followed by S3.

In S3, changes in an electrical supply voltage, which is present at the charging device of the mobile radio appliance is made available by the charging unit, for charging the battery are brought about over a predefinable period of time by the charging unit, in particular by a control device of the charging unit. For this purpose, the supply voltage is pulsed for example, over a short period of time. This short time window can last for several seconds or even only milliseconds. On account thereof, the charging unit can be identified on the basis of its signal within a short time.

On account thereof of this pulsing, an identification signal is modulated onto the electrical supply voltage by which the charging apparatus can be identified by the mobile radio appliance. It is therefore possible, for example by way of a computer program, to identify different charging units which are to be coupled to the charging device.

Fourth, in S4, the fulfillment of a plurality of conditions is checked. If the computer program for identifying the charging apparatus is executed, for example, in the background by the computing device, and if the charging apparatus is detected by the computing device as a result of the charging-unit-specific pulse and if the identified charging unit is assigned what is referred to as a profile, then fifth, S4 is followed by S5. In S5, the battery is charged and the profile which is assigned to the identified charging unit is activated. If one of the abovementioned conditions which were checked in S4 is not fulfilled, then sixth, S4 is followed S6 in which the battery is charged, but no profile is activated.

The term profile refers to the totality of the previously described states of the functionalities of the mobile radio appliance, wherein the profile is assigned the states of the respective functionality which have respectively previously been selected by the user of the mobile radio appliance before the coupling of the charging device to the charging apparatus. In other words, the user can configure the profile and can select the respective state of the respective function within the scope of the configuration of a profile. On account of activation of the profile, the states of the functionalities which have respectively previously been selected by the user and assigned to the profile are then set.

This means that in S5 the respective states of the functionalities which have previously been selected by the user are set automatically when the conditions which are specified with respect to S4 are fulfilled. This means here that the first functionality (WLAN) is set to its second state (deactivated), and the second functionality (Bluetooth) is set to its first state (activated), without the user having to make inputs into the mobile radio appliance on the mobile radio appliance.

In this context, the profile which is assigned to the charging unit is activated whenever the charging device is coupled to this charging unit. The functionalities therefore always have the same states selected by the user after the coupling if the states are not correspondingly changed by the user. On account of this automatic setting of the states, the user is spared the need to make laborious and time-consuming inputs in order to set the states manually.

The user sets the profile, for example, once, i.e. he configures the profile so that whenever the user enters the motor vehicle and when the charging device is coupled to the charging apparatus the desired states of the respective functionalities are set automatically. On account thereof environmentally dependent and need-oriented activation and deactivation of the functionalities can take place.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating an electronic appliance which has a battery and a charging device for charging the battery with electric current, comprising:
   using an application program on the electronic appliance, preselecting at least one functionality state of the electronic appliance by a user of the electronic apparatus, each functionality state corresponding to a different charging apparatus;
   after preselecting the at least one functionality state, coupling the charging device to a current charging apparatus, which is external to the electronic appliance, for charging the battery;
   supplying an electrical supply voltage to the charging device via the current charging apparatus, for charging the battery;
   modulating an identification signal onto the supply voltage so as to change the supply voltage over a period of time, by the current charging apparatus;
   evaluating the changes brought about to the supply voltage and using the identification signal at the electronic appliance to identify the current charging apparatus; and
   after identifying the current charging apparatus, setting the electronic apparatus to the functionality state corresponding to the current charging apparatus.

2. The method as claimed in claim 1, wherein
   the electronic appliance is a mobile radio unit to wirelessly connect to a radio network, the mobile radio unit having a computing device to execute a computer program.

3. The method as claimed in claim 1, wherein
   the electronic appliance has a transmission module for wireless data transmission, and
   the transmission module is set to the functionality state corresponding to the current charging apparatus.

4. The method as claimed in claim 1, wherein
   first and second functionality states of the electronic appliance are preselected by the user of the electronic apparatus,
   the electronic apparatus is set to the first functionality state when the charging device is coupled to a first charging apparatus, and
   the electronic apparatus is set to the second functionality state when the charging device is coupled to a second charging apparatus, which is external to the electronic appliance, for charging the battery.

5. The method as claimed in claim 1, wherein
   the electronic apparatus is a device selected from the group consisting of a laptop computer, a personal digital assistant (PDA), a smartphone and a tablet personal computer.

6. The method as claimed in claim 1, further comprising:
   decoupling the charging device from the charging apparatus and deactivating the functionality state of the electronic apparatus corresponding to the current charging apparatus.

7. The method as claimed in claim 1, wherein
   the electronic appliance comprises a global positioning system (GPS) module, a Bluetooth data transmission module and a WiFi data transmission module, and
   the at least one functionality state specifies whether at least one of the GPS module, the Bluetooth data transmission module and the WiFi data transmission module are activated or deactivated.

8. The method as claimed in claim 7, wherein
   the at least one functionality state specifies whether each of the GPS module, the Bluetooth data transmission module and the WiFi data transmission module are activated or deactivated.

9. The method as claimed in claim 1, wherein
   the charging apparatus is a motor vehicle charging apparatus, and
   the at least one functionality state specifies activating Bluetooth data transmission and specifies deactivating WiFi data transmission.

10. The method as claimed in claim 1, wherein
    the signal is modulated onto the supply voltage by pulsing the supply voltage, only for a predetermined period of time.

11. A motor vehicle, comprising:
    an operative charging apparatus to receive an electronic appliance which has a battery and a charging device, the operative charging apparatus being external to the electronic appliance, the operative charging apparatus supplying an electrical supply voltage to the charging device to charge the battery with electric current, the electronic appliance being received after a user uses an application program on the electronic appliance to preselect at least one functionality state of the electronic appliance, each functionality state corresponding to a different charging apparatus; and
    a computing unit to modulate an identification signal onto the supply voltage supplied by the operative charging apparatus, so as to bring about changes in the supply voltage over a period of time, the identification signal being modulated onto the supply voltage so that the electronic apparatus evaluates the changes brought about to the supply voltage, uses the identification signal to identify the operative charging apparatus, and after identifying the operative charging apparatus, sets the electronic apparatus to the functionality state corresponding to the operative charging apparatus.

* * * * *